March 2, 1965     A. FISCHER     3,171,321
EXPANSION BOLT ARRANGEMENT
Filed May 10, 1961     3 Sheets-Sheet 1
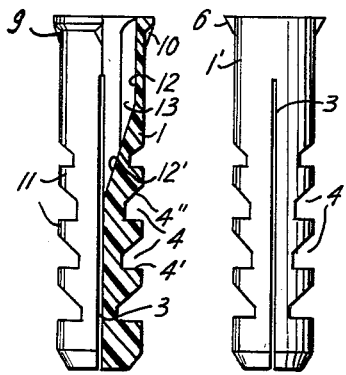
FIG.1    FIG.3        FIG.6
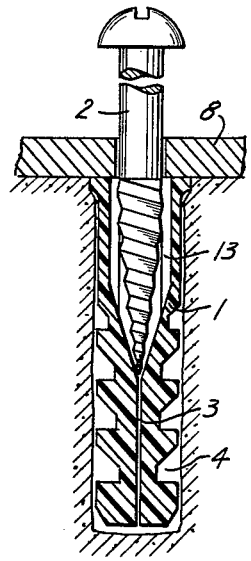
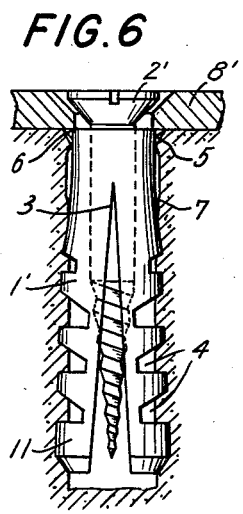
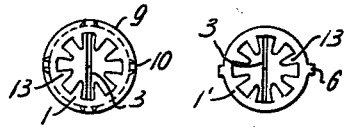
FIG.2    FIG.4     FIG.5
FIG.7    FIG.8    FIG.9    FIG.10
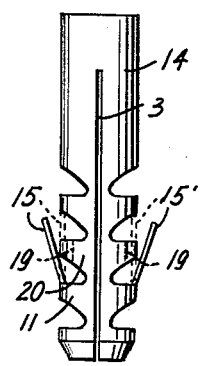 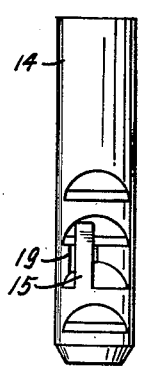 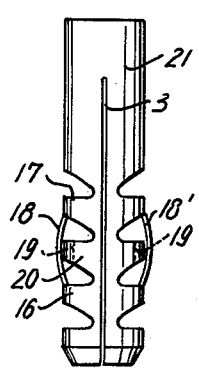 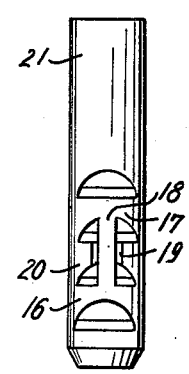
INVENTOR.
Artur Fischer
BY
Michael S. Striker
attorney

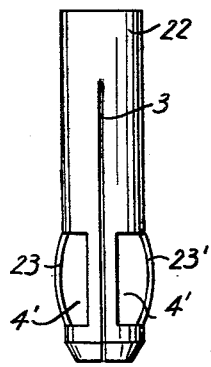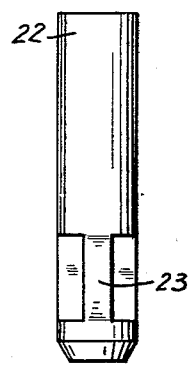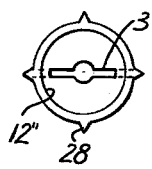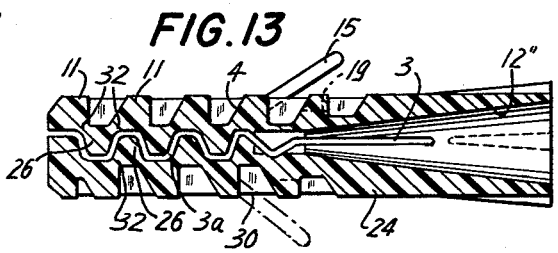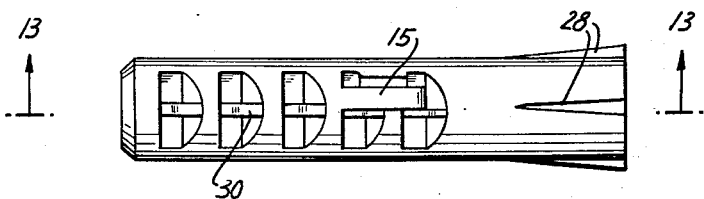

March 2, 1965     A. FISCHER     3,171,321

EXPANSION BOLT ARRANGEMENT

Filed May 10, 1961     3 Sheets-Sheet 3

United States Patent Office 3,171,321
Patented Mar. 2, 1965

3,171,321
EXPANSION BOLT ARRANGEMENT
Artur Fischer, Tumlingen, Kreis Freudenstadt, Germany
Filed May 10, 1961, Ser. No. 109,141
Claims priority, application Germany, May 14, 1960
F 31,239
2 Claims. (Cl. 85—83)

The present invention relates to expansion bolts.

The present application is a continuation-in-part application of my copending application filed November 2, 1959, with the Serial No. 850,196, and now abandoned, and entitled Expansion Bolt.

Conventional expansion bolt arrangements include a bolt member, a frustoconical nut member and a sleeve formed at the inner end thereof with a frustoconical bore portion cooperating with the nut member to expand the sleeve into engagement with the surface of a bore in a wall or the like when the bolt and nut member are drawn together.

It is an object of the present invention to provide for an expansion bolt arrangement which comprises fewer parts than conventional expansion bolt arrangements.

It is a further object of the present invention to provide for an expansion bolt arrangement which will be resiliently secured into a bore before expansion thereof by a screw or a bolt member.

An additional object of the present invention is to provide for an expansion bolt arrangement which will, when expanded, provide for a perfect grip in a bore of a wall or the like.

It is also an object of the present invention to provide an expansion bolt arrangement capable of accomplishing all the above objects and composed of simple and ruggedly constructed parts which are reliable in operation and which are simple and inexpensive to manufacture and assemble.

With these objects in view, the expansion bolt of the present invention includes an elongated pin member of resiliently deformable material formed with a central bore extending from one end of the pin member into the same and ending distant from the other end thereof in a convergent bore portion having its smallest diameter at the inner end of said bore, which pin member is also formed with a slot extending from the other end of the pin member beyond said inner end of said bore toward, but short of the one end of the pin member, whereby a screw or the like driven in the bore will expand the pin member in the region of the other end thereof.

The expansion bolt arrangement according to the present invention preferably also includes resilient web means connected at least at one end thereof to the outer surface of the pin member and having a portion distant from the connected end spaced farther from the axis of the pin member than any other outer surface portion of the latter for resiliently maintaining the pin member in a bore having a diameter slightly greater than the pin member, before the pin member is expanded by insertion of a screw or the like into the bore thereof.

The aforementioned slot divides the pin member into two pin portions united with each other in the region of the one end of the pin member and each of the pin portions may be formed with a plurality of grooves extending spaced from each other in axial direction and transverse to the axis of the pin member from the outer surface of the respective pin portion inwardly toward but short of the slot, to form a plurality of longitudinally spaced teeth projecting radially outwardly from the slot.

The slot may have, at least in the region of the other end of the pin member, a zig-zag configuration so as to form on each pin portion spaced projections extending across the axis of the pin member and between spaced projections on the other pin portion. The height of these projections may decrease from the other end towards the one end of the pin member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned side view of one embodiment of a pin member according to the present invention;

FIG. 2 is a top view of the embodiment shown in FIG. 1;

FIG. 3 is a side view of a slightly different embodiment of the pin member according to the present invention;

FIG. 4 is a top view of the embodiment shown in FIG. 3;

FIG. 5 is a sectioned view of the embodiment illustrated in FIG. 1 and shown located in a bore of a wall with a good screw partly driven in the bore of the pin member;

FIG. 6 is a side view of the embodiment illustrated in FIG. 3 shown in expanded position in a hole formed in a wall;

FIG. 7 is a side view of a pin member according to the present invention provided with resilient web means;

FIG. 8 is a front view of the embodiment shown in FIG. 7;

FIG. 9 is another embodiment of a pin member according to the present invention illustrating web means differing from the web means shown in FIG. 7;

FIG. 10 is a front view of the embodiment shown in FIG. 9;

FIG. 11 is a further embodiment of the pin member according to the present invention and showing differently arranged web means;

FIG. 12 is a front view of the embodiment shown in FIG. 11;

FIG. 13 is a cross-section taken along the line 13—13 of FIG. 15 of a still further embodiment of a pin member according to the present invention showing a slot of zig-zag configuration;

FIG. 14 is a top view of the embodiment shown in FIG. 13 viewed in the direction of the arrow A shown in FIG. 13;

FIG. 15 is a side view of the embodiment shown in FIG. 13;

Figure 16:
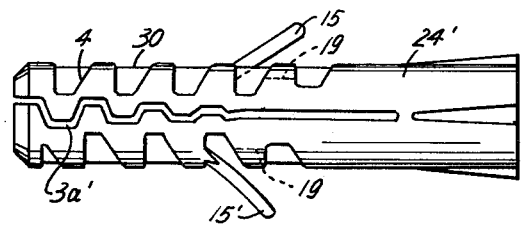
FIG. 16 is a front view of an embodiment differing slightly from the embodiment shown in FIG. 13.

Referring now to the drawing and more particularly to FIGS. 1 and 2 of the same, it will be seen that the expansion bolt arrangement according to the present invention comprises an elongated pin member 1 of substantially cylindrical configuration and formed with a substantially central bore 12 extending from one end of the pin member 1, shown in FIG. 1 as the upper end thereof, into the pin member and ending distant from the other or lower end thereof in a convergent bore portion 12' having its smallest diameter at the inner end of the bore. The pin member 1 is also formed with a slot 3 extending transversely therethrough and in longitudinal direction from the other or lower end of the pin member beyond the inner end of the bore toward but short of the one or upper end of the pin member. This slot 3 divides the pin member into two pin portions united with each other in the region of the upper end of the pin member. A plurality of grooves 4 are formed in each of the pin portions and grooves 4 are spaced from each other in longitudinal direction of the pin member. Grooves 4 extend in a direction transverse to the axis of the pin member from the outer surface of the respective pin portion inwardly toward but short of the slot 3. The grooves 4 have preferably a trapezoidal cross section and one face 4' of each groove preferably extends substantially normal to the axis of the pin member whereas another face 4' has an outer edge nearer to the upper end of the pin member than the inner edge thereof. The spaced sawtooth-like arranged grooves 4 form therefore on the two pin portions sawtooth-like arranged teeth 11 projecting radially outwardly from the slot 3. The upper end of the pin member 1 may be formed with an annular bead 9 adapted to limit the extent to which the pin member 1 may be inserted into an elongated hole in the wall or the like as shown in FIG. 5. A plurality of short ribs 10 may also be provided distributed about the periphery of the pin member 1 and tapering from the bottom face of the annular bead 9 toward the outer surface of the pin member.

A plurality of elongated ribs 13 may also be provided in the interior of the bore 12 distributed spaced from each other along the inner surface of bore 12 and projecting from this inner surface toward the axis of the pin member 1 and having inner edges substantially equally spaced from the pin axis a distance smaller than the radius of the cylindrical portion of the bore 12. Ribs 13 serve to guide a screw member 2 having a diameter slightly smaller than the inner diameter of the cylindrical portion of the bore 12 during insertion of the screw member 2 into the pin member 1 along the axis of the pin member as shown in FIG. 5.

FIGS. 3 and 4 show a pin member 1' similar to the pin member 1 illustrated in FIGS. 1 and 2. Pin member 1' differs from the embodiment shown in FIGS. 1 and 2 in that the annular bead 9 is omitted from the pin member and a pair of short substantially triangular ribs 6 are arranged projecting radially outwardly and opposite to each other with the top surface of the ribs 6 flush with the top surface of the pin member. Ribs 6 as well as ribs 10 shown in FIGS. 1 and 2 serve to prevent rotation of the pin member when a screw is screwed in the bore thereof to spread the pin member at the lower end thereof.

FIGS. 5 and 6 respectively show the use of pin members as shown in FIGS. 1 and 3 for fastening an element 8 or 8' to a wall or the like. FIG. 5 shows a pin member 1 as illustrated in FIGS. 1 and 2 inserted into an elongated hole of a wall or the like having a diameter slightly greater than the outside diameter of pin member 1. Arranged next to the outer surfaces of the wall is a member 8 to be fastened to the wall and which is formed with an opening therethrough aligned with the bore 12 of the pin member 1. A round head wood screw 2 is then inserted through the opening of the member 8 into the bore 12 of the pin member 1 until the lower end of the screw 2 reaches the tapered end of the bore 12. A screw driver is then inserted into the slot of the round screw head and the screw 2 is screwed into the pin member 1, whereby the lower tapered end of the screw will wedge the portions of the pin member 1 located on opposite sides of the slot 3 apart as shown in FIG. 6 so that the teeth 11 at the lower end of the pin 1 will be wedged against the inner surface of the elongated hole in the wall or, if the wall is formed from material softer than the material from which the pin member 1 is formed, teeth 11 will dig slightly into the wall as shown in FIG. 6. FIG. 6 shows the pin member 1' arranged in an elongated hole in a wall fully expanded by a screw 2' to fasten a member 8' to the outer surface of the wall. The screw 2' for expanding the pin member 1' is illustrated in FIG. 6 as a flat head screw and the member 8' is in this case preferably provided with a counter sunk opening therethrough so that the flat surface of the screw head may be flush with the outer surface of the member 8'. In the arrangement illustrated in FIG. 6 it is assumed that the wall is formed from softer materials than the pin member 1' and the teeth 11 dig therefore slightly into the wall as shown in FIG. 6. The pin members 1 and 1' are preferably formed from synthetic plastic material. The short rib 6 provided at the upper end of the pin member 1' have at the lower face thereof prefreably a knife edge extension 5 which will dig into the wall and prevent thereby rotation of the pin member 1' during screwing of the screw 2' into the bore of the pin member. Of course, a flat head screw 2' may be used together with the pin member illustrated in FIG. 1 or a round head screw may also be used in connection with the pin member 1' as illustrated in FIG. 3.

FIGS. 7–12 illustrate further embodiments of the pin member according to the present invention in which the pin member is provided on opposite pin portions thereof with resilient web means adapted to resiliently maintain the respective pin member in an elongated hole formed in a wall or the like before the pin member is expanded by a screw inserted into the bore thereof. The embodiment shown in FIGS. 7 and 8, comprises a pair of resilient web means or webs 15, 15', one connected at one end thereof to one tooth adjacent to the lower end of the pin member 14 and on one of the pin portions located to the left of the slot 3, as viewed in FIG. 7, and the other connected at one end thereof to one tooth 11 on the other of the pin portions and each of the webs 15, 15' projects from the connected end thereof away from the axis of the pin member at an acute angle thereto toward the upper end of the pin member beyond the tooth 20 adjacent to the tooth to which the one end of the web is connected. Tooth 20 is preferably formed at the outer end thereof with a longitudinally extending groove 19 permitting flexing of the respective web into groove 19 during insertion of the pin member into a bore. The outwardly projecting webs 15 and 15' will resiliently maintain the pin member 14 in a bore having a slightly larger diameter than the outer diameter of the pin by resilient engagement with the inner wall of the elongated bore formed in a wall or the like.

FIGS. 9 and 10 show an embodiment different slightly from the embodiment illustrated in FIGS. 7 and 8. The pin 21 illustrated in FIGS. 9 and 10 is provided at the lower portion thereof with a plurality of spaced teeth projecting in opposite direction radially outwardly from the slot 3 and a pair of oppositely arranged web means 18, 18' are provided which are connected at opposite ends thereof to teeth 16 and 17 and bridging the tooth 20 located between the teeth 16 and 17. The resilient web means 18, 18' bulge between the connected ends thereof radially outwardly and have intermediate the connected ends thereof a distance from the axis of the pin member 21 which is greater than the radius of the pin member. The resilient web means 18, 18' will therefore resiliently maintain the pin member 21 when the latter is inserted into an elongated hole in a wall or the like having a diameter greater than the diameter of the pin. The teeth 20 are preferably formed at the outer end thereof with a groove 19 extending in axial direction of the pin member permitting flexing of the web means 18 and 18' into the grooves 19, respectively, during insertion of the pin into an elongated hole in a wall or the like. The side walls of the grooves 19 shown in FIGS. 7 and 9 will also, when the respective web means is partly flexed thereinto, prevent angular displacement or angular distortion of the respective web means during turning of pin member 21 while screwing a screw into the bore of the pin member.

The pin 22 illustrated in FIGS. 11 and 12 differs slightly from the before-described embodiments. Pin member 22 is likewise formed with a transverse slot 3 therethrough extending in longitudinal direction from the lower end toward the upper end of the pin member and ending short of the upper end so as to divide the pin 22 into a pair of opposite pin portions connected at the upper end of the pin member to each other. It is further understood that the pin 22 as well as the pins 14 and 31 are formed with a central bore 12 thereinto as illustrated in FIG. 1 having at the inner end thereof a convergent end portion 12'. Instead of a plurality of saw-tooth shaped grooves 4 the pin member 22 is formed in each portion thereof located at opposite sides of the slot 3 with a single elongated groove 4' having end faces substantially normal to the axis of the pin member. A pair of web means 23 and 23' are provided which are connected at opposite ends thereof, respectively, to the outer edges of the end faces of the grooves 4' and the web means 23, 23' bulge intermediate the connected end thereof radially outwardly to a distance from the axis of the pin member 22 greater than the radius thereof. The web means 23, 23' serves the same purpose as the web means 15, 15' and 18, 18' of the previously described embodiments.

Figure 17:
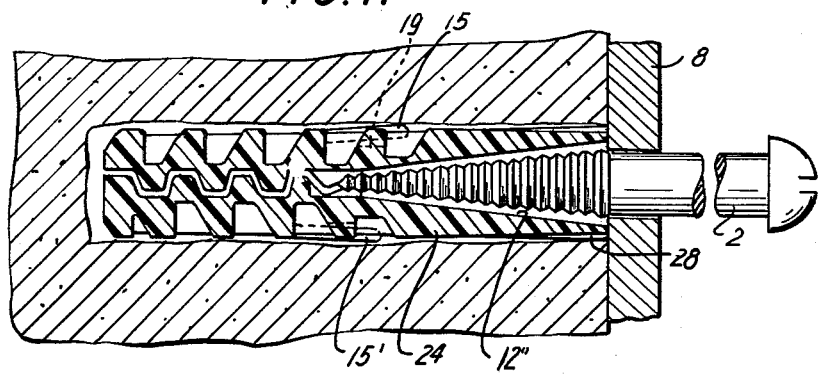
FIG. 17 is a cross-section of the embodiment shown in FIGS. 13–15 arranged in a bore of a wall or the like with a wood screw inserted into the tapered bore of the pin member.
Figure 18:
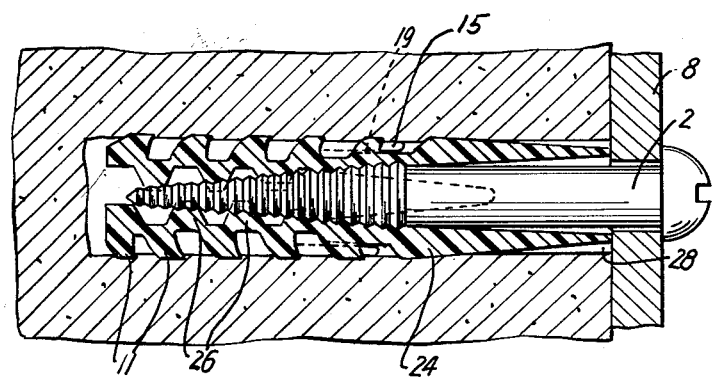
FIG. 18 is a longitudinal section similar to FIG. 17 and showing the wood screw driven all the way into the pin member and the latter in expanded condition.

FIGS. 13–15 illustrate a further embodiment of the pin member according to the present invention. The pin member 24 of substantially cylindrical configuration is formed with a central tapered bore 12" extending from one end of the pin member 24 into the same and ending short of the other end of the pin member. Pin member 24 is also formed with a slot 3 extending transversely therethrough and in longitudinal direction from the other end of the pin member 24 beyond the inner end of the bore 12" toward but short of the one end of the pin member so as to divide the latter into two pin portions united with each other in the region of the pin member 24. The slot 3 has at least in the region of the other end of the pin member a slot portion 3a of zig-zag configuration so as to form on each pin portion spaced projections 26 extending across the axis of the pin member and between spaced projections on the other pin portion. The projections 26 formed by the zig-zag portion 3a of the slot may have all the same height as illustrated in FIG. 13 or the height of the projections 26 may decrease from the left end of the slot, as viewed in FIG. 16, to the right end thereof. Each of the pin portions located on opposite sides of the slot 3 is preferably formed with a plurality of grooves 4 spaced from each other in longitudinal direction of the pin member and extending transverse to the axis thereof from the outer surface of the respective pin portion toward but short of the slot. The plurality of grooves 4 are preferably respectively aligned in direction transverse to the pin axis with the projections 26 formed on the respective pin portion so as to form at the root of each projection 26 weakened cross-sections as indicated at 32. Preferably a rib 30 extends in longitudinal direction through each of the grooves 4. The pin member 24 illustrated in FIGS. 13–15 or the pin member 24' illustrated in FIG. 16 may also be provided with resilient web means 15, 15' respectively connected at one end thereof to teeth formed on the opposite pin portions and projecting from the connected ends thereof inclined at an acute angle to the axis of the pin member away from the axis toward the right end, as viewed in FIGS. 13 and 16, beyond the tooth adjacent the tooth to which the one end of the web means is connected. The adjacent tooth is preferably formed in the outer end thereof with a longitudinally extending groove permitting flexing of the respective web means at least partly in the longitudinal groove 19 during insertion of the pin member into an elongated hole in a wall as illustrated in FIGS. 17 and 18. The resilient web means 15, 15' formed on the pin members 24 and 24' serve the same purpose as the resilient web means 15, and 15' described in connection with FIGS. 7 and 8.

Of course, the pin members 24 and 24' may also be formed with resilient web means 18 and 18' shown in FIGS. 9 and 10. The pin members 24 or 24' may also be formed at the right end thereof as viewed in FIGS. 15 and 16 with a short rib 28 projecting radially from the outer surface thereof and serving the same purpose as the rib 10 described in connection with FIG. 1.

FIGS. 17 and 18 illustrate the use of the pin member 24 for fastening an element 8 to the outer surface of the wall. The pin member 24 is inserted into an elongated hole formed in a wall or the like, whereby the resilient web means 15, 15' will resiliently maintain the pin member 24 in the elongated hole even if the axis of the latter should be downwardly inclined to a horizontal. During this insertion the web means 15 and 15' will partly flex into the grooves 19 provided into the teeth over which the web means 15 and 15' respectively extend. A member 8 is then placed against the outer surface of the wall with an opening formed therein aligned with the bore 12" in the pin member 24. A wood screw 2 is then pushed through the opening in the member 8 into the tapered bore 12" of the pin member 24 until the pointed end of the screw 2 is located at the inner end of the tapered bore 12". A screw driver is then put into the slot of the screw head and the screw 2 screwed into the left end portion, as viewed in FIG. 18, of the pin member 24, whereby the threaded end of the screw 2 will engage the projections 26 formed by the zig-zag portion 3a of the slot to spread the portions of the pin member 24 on opposite sides of the slot portion 3a in opposite directions so that the teeth 11 will be pressed against the inner surface of the elongated hole formed in the wall. When the wall is formed from material softer than the material of the pin member 24 the teeth 11 will dig slightly into the wall as illustrated in FIG. 18 to thus securely anchor the pin member 24 in the hole. The pin member 24 is also preferably formed from synthetic plastic material.

It will be understood that each of the elements described above, or two or more together, may also find a useful application in other types of fasteners differing from the types described above.

While the invention has been illustrated and described as embodied in expansion bolts, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by the Letters Patent:

1. In an expansion bolt arrangement, in combination, an elongated pin member of resiliently deformable material formed with a substantially central bore extending from one end of said pin member into the same and ending distant from the other end thereof in a convergent bore portion having its smallest diameter at the inner end of said bore, said pin member being also formed with a slot extending transversely therethrough and in longitudinal direction from said other end of said pin member beyond said inner end of said bore toward but short of said one end of said pin member so as to divide said pin member into two pin portions united with each other in the region of said one end of said pin member, said slot extending in the region of said one end of said pin member substantially along a plane passing through the axis of said pin member and having in the region of said other end of said pin member a zig-zag configuration so as to form on each pin portion spaced projections extending across the axis of said pin member and between spaced projections on the other pin portion, each of said pin portions being formed with a plurality of grooves spaced from each other in longitudinal direction of said pin member and extending transverse to the axis thereof from an outer surface portion of the respective pin portion distant from said slot toward but short of said slot and having each a base face substantially parallel and closely adjacent to said plane of said slot, said plurality of grooves being respectively aligned in a direction transverse to said axis with said projections formed on the respective pin portion so as to form at the root of each projection a weakened cross section.

2. In an expansion bolt arrangement, in combination, an elongated pin member of resiliently deformable material formed with a substantially central bore extending from one end of said pin member into the same and ending distant from the other end thereof in a convergent bore portion having its smallest diameter at the inner end of said bore, said pin member being also formed with a slot extending transversely therethrough and in longitudinal direction from said other end of said pin member beyond said inner end of said bore toward but short of said one end of said pin member so as to divide said pin member into two pin portions united with each other in the region of said one end of said pin member, said slot extending in the region of said one end of said pin member substantially along a plane passing through the axis of said pin member and having in the region of said other end of said pin member a zig-zag configuration so as to form on each pin portion spaced projections extending across the axis of said pin member and between spaced projections on the other pin portion, each of said pin portions being formed with a plurality of grooves spaced from each other in longitudinal direction of said pin member and extending transverse to the axis thereof from an outer surface portion of the respective pin portion distant from said slot toward but short of said slot and having each a base face substantially parallel and closely adjacent to said plane of said slot, said plurality of grooves being respectively aligned in a direction transverse to said axis with said projections formed in the respective pin portion; and a rib extending in longitudinal direction through each of said grooves, whereby a screw or the like driven in said bore will expand said pin member in the region of said other end thereof.

References Cited in the file of this patent

UNITED STATES PATENTS

| 1,743,492 | Sipe | Jan. 14, 1930 |
| 1,754,333 | Pleister | Apr. 15, 1930 |
| 1,855,482 | McArthur | Apr. 26, 1932 |
| 2,399,069 | Skinner | Apr. 23, 1946 |

FOREIGN PATENTS

| 673,035 | Germany | Feb. 23, 1939 |
| 910,588 | Germany | May 3, 1954 |
| 530,042 | Italy | July 2, 1955 |